United States Patent

Hafner et al.

[11] Patent Number: 5,998,326
[45] Date of Patent: Dec. 7, 1999

[54] TWO-COMPONENT CATALYST FOR ROMP

[75] Inventors: Andreas Hafner, Laupen; Paul Adriaan Van Der Schaaf, Fribourg; Andreas Mühlebach, Belfaux, all of Switzerland

[73] Assignee: Ciba Specialty Chemicals Corp., Tarrytown, N.Y.

[21] Appl. No.: 09/075,637

[22] Filed: May 11, 1998

[51] Int. Cl.[6] .............................. B01J 31/18; B01J 31/24
[52] U.S. Cl. ...................... 502/155; 502/162; 502/169; 526/145; 526/170; 526/172
[58] Field of Search .................... 502/155, 162, 502/169

[56] References Cited

U.S. PATENT DOCUMENTS

| | | | |
|---|---|---|---|
| 3,933,919 | 1/1976 | Wilkinson | 260/604 HF |
| 4,426,502 | 1/1984 | Minchat | 526/172 |
| 4,519,954 | 5/1985 | Burrington et al. | 260/465.8 |
| 5,710,298 | 1/1998 | Grubbs et al. | 556/22 |

FOREIGN PATENT DOCUMENTS

| | | |
|---|---|---|
| 0348852 | 1/1990 | European Pat. Off. |
| 9616100 | 5/1996 | WIPO |
| 9620235 | 7/1996 | WIPO |

*Primary Examiner*—David W. Wu
*Assistant Examiner*—Caixia Lu-Rutt
*Attorney, Agent, or Firm*—David R. Crichton

[57] ABSTRACT

A catalyst system for the ring-opening matathesis polymerization, which consists of at least two components (a) and (b), wherein (a) is a ruthenium compound of formula I or II $$RuX_2(L_1)_m(L_2)_n(L_3)_o(L_4)_p \quad (I),$$

$$ARuX_2(L_1)_r(L_2)_s \quad (II),$$

wherein $L_1, L_2, L_3$ and $L_4$ are each independently of the other $C_1$–$C_{18}$alkylcyanide, $C_6$–$C_{24}$- aralkylcyanide, tertiary amine, tertiary phosphine which does not contain any secondary alkyl or cycloalkyl radicals bound to the phosphorus atom, or phosphite, X is halogen, A is arene, m, n, o and p are integers from 0 to 4, where $2 \leq m+n+o+p \leq 4$, r and s are integers from 0 to 2, where $1 \leq r+s \leq 2$, and (b) is a tertiary phosphine containing at least one secondary alkyl radical or cycloalkyl radical bound to the phosphorus atom, is particularly suitable for the polymerisation of strained cycloolefins by the RIM process.

8 Claims, No Drawings

TWO-COMPONENT CATALYST FOR ROMP

The present invention relates to a two-component catalyst system for the ring-opening metathesis polymerization (ROMP), to a curable system comprising such a catalyst system, to a process for the preparation of moulded articles as well as to the use of the curable system as encapsulating material for electrical or electronic components.

U.S. Pat. No. 4,426,502 and EP-A-348 852 describe the ring-opening matathesis polymerization (ROMP) of strained cycloolefins by the RIM process (reaction injection moulding). In this case a two-component system consisting of a catalyst and a co-catalyst is used for the ring-opening metathesis polymerisation. According to the process described in the above publications, the polymerisable cycloolefin is divided into two portions, one half comprising the catalyst and the other half the corresponding co-catalyst. When the two portions are mixed and injected into the preheated mould, the mixture cures quickly. However, the use of organo aluminium compounds as co-catalysts requires the exclusion of moisture.

WO 96/16100 and WO 96/20235 describe ruthenium catalysts which are not susceptible to moisture but which are unsuitable for RIM process because of their high reactivity.

It is the object of this invention to provide a two-component catalyst system for ring-opening metathesis polymerisation which is stable against air and moisture and which is sufficiently reactive for the RIM process.

It has now been found that certain ruthenium complexes and tertiary phosphines containing secondary alkyl or cycloalkyl groups form a suitable storage-stable two-component system which affords cured products having excellent properties, in particular high heat stability, high toughness and mechanical strength.

Accordingly, this application relates to a catalyst system for the ring-opening metathesis polymerisation, which consists of at least two components (a) and (b), wherein
 (a) is a ruthenium compound of formula I or II $$RuX_2(L_1)_m(L_2)_n(L_3)_o(L_4)_p \quad (I),$$

$$ARuX_2(L_1)_r(L_2)_s \quad (II),$$

wherein $L_1$, $L_2$, $L_3$ and $L_4$ are each independently of the other $C_1$–$C_{18}$alkylcyanide, $C_6$–$C_{24}$-aralkylcyanide, tertiary amine, tertiary phosphine which does not contain any secondary alkyl or cycloalkyl radicals bound to the phosphorus atom, or phosphite, X is halogen, A is arene, m, n, o and p are integers from 0 to 4, where $2 \leq m+n+o+p \leq 4$, r and s are integers from 0 to 2, where $1 \leq r+s \leq 2$, and
 (b) is a tertiary phosphine containing at least one secondary alkyl radical or cycloalkyl radical bound to the phosphorus atom.

The ruthenium compounds of formula I or II can be prepared by known processes by reacting ruthenium dihalides with the corresponding arenes, nitriles, amines, phosphines or phosphites.

$C_1$–$C_{18}$Alkylcyanides which are suitable as ligands $L_1$ to $L_4$ are, for example, acetonitrile, propionitrile, n-butyronitrile, isobutyronitrile, pivalonitrile, neopentylcyanide, valeronitrile, capronitrile, n-heptylcyanide, n-octylcyanide, n-nonylcyanide and n-decylcyanide. Typical examples of suitable $C_6$–$C_{24}$aralkylcyanides are phenylacetonitrile, 3-phenylpropionitrile, 4-phenylbutyronitrile and naphthylacetonitrile.

Tertiary amines suitable as ligands $L_1$ to $L_4$ are, for example trimethylamine, triethylamine, tri-n-propylamine, triisopropylamine, tri-n-butylamine, triisobutylamine, tri-tert-butylamine, benzyldimethylamine, triphenylamine, tricyclohexylamine, phenyldimethylamine, phenyldiethylamine, cyclohexyldimethylamine, cyclohexyldiethylamine, urotropine, triethylenediamine, N-methylpiperidine and N-ethylpiperidine.

$L_1$ to $L_4$ defined as tertiary phospine may, for example, trimethylphosphine, triethylphosphine, tri-n-propylphospine, tri-n-butylphosphine, triphenylphosphine, methyldiphenylphosphine, dimethylphenylphosphine, tri-n-octylphosphine, tritolyphosphine or a compound of formula III

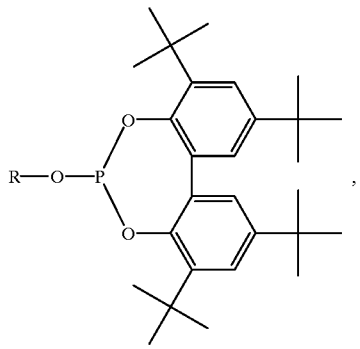

(III)

wherein R is $C_1$–$C_{18}$alkyl, $C_5$–$C_{14}$aryl or $C_6$–$C_{24}$aralkyl.

The alkyl groups in formula III may be straight-chain or branched an preferably contain 1 to 12, particularly preferably 1 to 8 and, most preferably, 1 to 4, carbon atoms.

Alkyl encompasses, for example, methyl, ethyl, isopropyl, n-propyl, n-butyl, isobutyl, sec-butyl, tert-butyl as well as the different isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

R defined as aryl preferably contains 6 to 10 carbon atoms and is typically phenyl, tolyl, pentalinyl, indenyl, naphtyl, azulinyl and anthryl.

R defined as aralkyl preferably contains 7 to 12 carbon atoms, particularly preferably 7 to 10 carbon atoms, and is typically benzyl, phenethyl, 3-phenylpropyl, α-methylbenzyl, 4-phenyl-butyl and α,α-dimethylbenzyl.

Phosphites suitable as ligands $L_1$ to $L_4$ are, for example, trimethylphosphite, triethylphosphite, tri-n-propylphosphite, triisopropylphosphite, tri-n-butylphosphite, triphenylphosphite, methyldiphenylphosphite, dimethylphenylphosphite, tri-n-octylphosphite, tritolylphosphite or tris(p-nonylphenyl) phosphite, or compounds of the above formula III.

X in formula I or II is fluoro, chloro, bromo or iodo. Chloro is preferred.

The term "arene" generally stands for aromatic compounds. A in formulae II and III is preferably a monocyclic, polycyclic or condensed arene which is unsubstituted or substituted by OH, $C_1$–$C_4$alkyl, $C_1$–$C_4$alkoxy, $c_6$–$C_{12}$aryl or halogen and which contains 6 to 24, preferably 6 to 18, particularly preferably 6 to 12, carbon atoms. some examples or arenes and heteroarenes are benzene, toluene, o-xylene, p-xylene, mesitylene, ethylbenzene, cumene, 1,3,5-triisopropylbenzene, p-cymene, durene, hexamethylbenzene, naphthalene, biphenyl, diphenylmethane, anthracene, acenaphthene, fluorene, phenanthrene, pyrene, chrysene, fluoranthrene, furan, thiophene, pyrrole, pyridine, γ-pyran, γthiopyran, pyrimidine, pyrazine, indole, coumarone, thionaphthene, carbazole, dibenzofuran, benzothiophene, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazine, thianthrene and purine. Preferred arenes and heteroarenes are unsubstituted or substituted benzene, naphthalene, thiophene and benzothiophene.

Suitable components (b) of the catalyst system of this invention are, in principle, all tertiary phosphines which contain at least one secondary alkyl or cycloalkyl group bound direct to the phosphorus atom.

Examples to be mentioned of such phosphines are isopropyldimethylphosphine, diisopropyl-methylphosphine, isopropyldiethylphosphine, diisopropylethylphosphine, isopropyldiphenyl-phosphine, diisopropylphenylphosphine, triisopropylphosphine, tri-sec-butylphosphine, tris(1-methylbutyl)phosphine, tris(1-ethylbutyl)phosphine, cyclohexyldimethylphosphine, dicyclohexylmethylphosphine and tricyclohexylphosphine.

In a preferred embodiment of this invention, component (a) is a compound of formula II, wherein A is benzene, toluene, o-xylene, p-xylene, mesitylene, ethylbenzene, cumene, 1,3,5-triisopropylbenzene, p-cymene, durene, hexamethylbenzene, naphthalene, biphenyl or diphenylmethane.

Component (a) is preferably also a compound of formula I or II, wherein one or several ligands $L_1$ to $L_4$ are acetonitrile, propionitrile, n-butyronitrile, valeronitrile or capronitrile.

Also preferred as component (a) are compounds of formula I or II, wherein one or several ligands $L_1$ to $L_4$ are triphenylphosphine, methyldiphenylphosphine, dimethylphenylphosphine, tri(n-butyl)phosphine, tri(n-octyl)phosphine, trimethylphosphite, triisopropylphosphite, triphenylphosphite, tris(p-nonylphenyl)phosphite or a compound of formula III

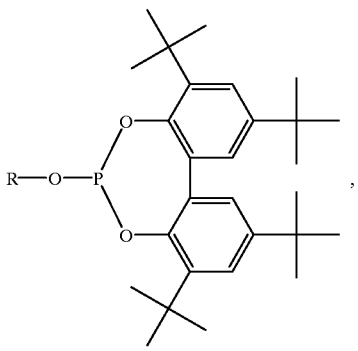

(III)

wherein R is $C_1$–$C_{18}$alkyl, $C_5$–$C_{14}$aryl or $c_6$–$C_{24}$aralkyl.

Component (a) is particularly preferably a compound of formula II, wherein A is p-cymene, r is 2, and $L_1$ is butyronitrile or capronitrile.

Component (a) is also particularly preferably a compound of formula II, wherein A is p-cymene, r is 1, s is 0, and $L_1$ is triphenylphosphite, tris(p-nonylphenyl)phosphite or 2,4,8,10-tetrakis(1,1-dimethylethyl)-6-methoxydibenzo[d,f][1,3,2]dioxaphosphepine.

Component (b) is preferably triisopropylphosphine or tricyclohexylphosphine.

Components (a) and (b) are both not reactive against strained cycloolefins, i.e. mixtures comprising a cycloolefin and component (a) or a cycloolefin and component (b), are storage-stable at room temperature for several months. Only when the two components are mixed is a product obtained which acts as catalyst for the ring-opening metathesis polymerisation. The novel two-component system is thus particularly suitable for RIM process because the polymerisable cycloolefin can be divided into two portions before processing, to which the corresponding amounts of the components (a) and (b) are added. When the two portions are mixed and injected into the preheated mould, the mixture polymerises very quickly and forms cured products having good properties.

This invention therefore also relates to a curable two-component system, which consists of at least two components (c) and (d), wherein (c) is a mixture consisting of 90.0–99.999% by weight, preferably of 95.0–99.99% by weight, more preferably of 98.0–99.6% by weight, of a strained cycloolefin, and of 0.001–10.0% by weight, preferably of 0.1–5.0% by weight, more preferably of 0.4–2.0% by weight, of the above component (a), and (d) is a mixture consisting of 90.0–99.999% by weight, preferably of 95.0–99.9% by weight, more preferably of 98.0–99.6% by weight, of a strained cycloolefin, and of 0.001–10.0% by weight, preferably of 0.1–5.0% by weight, more preferably of 0.4–2.0% by weight, of the above component (b).

Within the scope of this invention, strained cycloolefins will be understood as meaning all cycloolefins with the exception of cyclohexene and its derivatives which cannot be polymerised by the ring-opening metathesis.

the strained cycloolefins may be monocyclic or polycyclic condensed or bridged ring systems containing e.g. two to four rings, which are unsubstituted or substituted and which can contain one or several hetero atoms, for example O, S, N or Si, in one or several rings, and/or condensed aromatic or heteroaromatic rings, for example o-phenylene, o-naphthylene, o-pyridinylene or o-pyrimidinylene. The individual cyclic rings can contain 3 to 16, preferably 3 to 12, particularly preferably 3 to 8, ring members. The strained cycloolefins can contain additional nonaromatic double bonds, depending on the ring size preferably 2 to 4 such additional double bonds.

If the strained cycloolefins contain more than one double bond, for example 2 to 4 double bonds, crosslinked polymers may also form, depending on the reaction conditions, the chosen monomer and the amount of catalyst.

Preferred cycloolefins are Diels-Alder adducts of cyclopentadiene.

Suitable Diels-Alder adducts of cyclopentadiene are, for example, the following compounds:

(1)

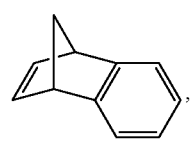

(2)

(3) 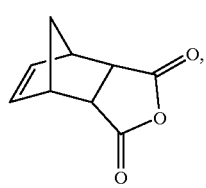
(4) 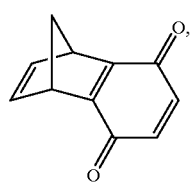
(5) 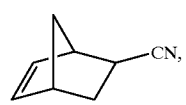
(6) 
(7) 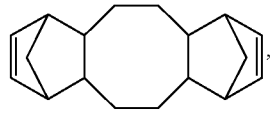
(8) 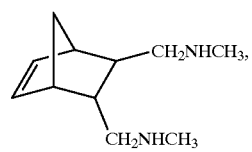
(9) 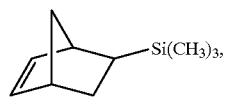
(10) 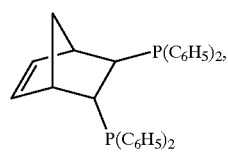
(11) 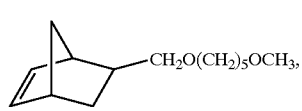
(11) 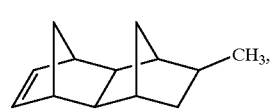
(12) 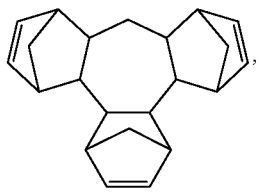
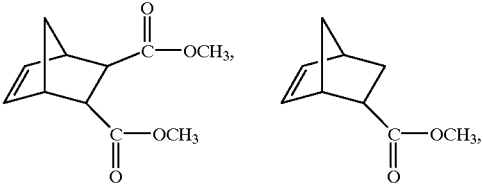
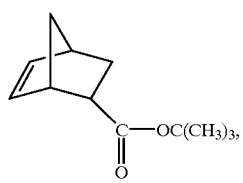 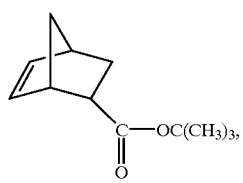
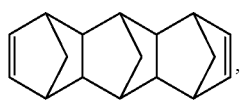
(13) 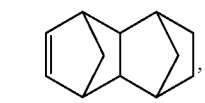
(14) 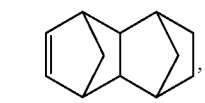
(15) 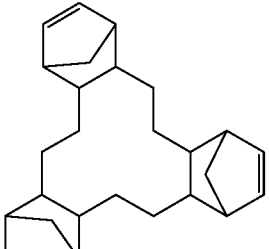
(16) 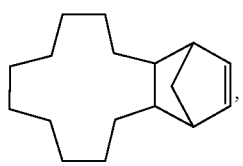
(17) 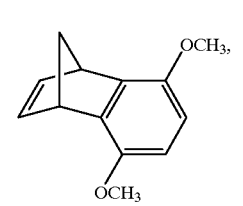

-continued

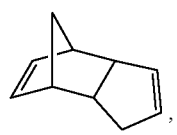
(18)

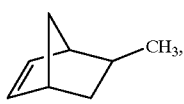
(19)

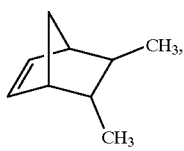
(20)

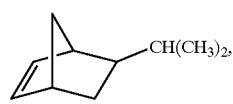
(21)

(22)

(23)

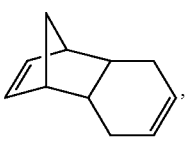
(24)

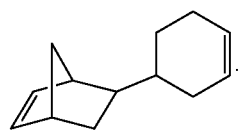
(25)

Preferred Diels-alder adducts are norbornene (1), norbornadien (6), cyclohexenylnorbornene (25), tetracyclododecene (14), methyltetracyclododecene (11) and, in particular, dicyclopentadiene (18).

The desired viscosity of the curable mixture can be adjusted by adding thermoplastic materials. Typical examples of suitable thermoplastics are polystyrene, polynorbornene (e.g. Norsorex® NS, or Nippon Zion), hydrated polynorbornene derivatives (e.g. Zeonex®, of Nippon Zeon), polycyclooctene (e.g. Vestenamer®, of Hüls) and polybutadiene.

the curable mixtures can also contain tougheners, such as core/shell polymers or the elastomers or elastomer-containing graft polymers which are known to the skilled person as rubber tougheners.

Suitable tougheners are described, inter alia, in EP-A-449 776.

To improve the electrical properties (dielectric constant, loss factor), it is possible to add silanes to the curable mixtures, for example the compounds available from Osi Specialties under the name Silquest® Silan. Suitable silanes are, for example octyltriethoxysilane, methyltriethoxysilane, vinyltriethoxysilane, methyltrimethoxysilane, vinyltrimethoxysilane, γ- aminopropyltrimethoxysilane and γ-glycidyloxypropyltrimethoxysilane.

In addition to the above-mentioned additives, the novel compositions can also contain other customary additives, such as antioxidants, light stabilisers, plasticisers, colourants, fillers pigments, thixotropic agents, antifoams, antistatic agents, lubricants and demoulding agents.

To increase the catalytic activity, a small amount of an alkine, typically 1-heptine, 1octine, 1-decine or phenylethine, can be added to component (b).

In another of its aspects, this invention relates to a process for the preparation of a metathesis polymer, which comprises heating a composition comprising the components (c) and (d) to a temperature of >40° C.

The inventive process is conveniently carried out at a temperature of at least 60° C. The inventive process is preferably carried out at a temperature in the range from 60 to 300° C., particularly preferably from 60 to bis 200° C. and, most preferably, from 70 to 160° C. After polymerisation it may be advantageous to anneal the mixture at elevated temperatures, for example in the range from 80 to 200° C.

the metathesis polymers prepared by the novel process can be homopolymers, copolymers with random distribution of the structural units, graft polymers, block polymers or crosslinked polymers. The polymers can have an average molecular weight of 500 to 2,000,000 dalton, preferably of 1,000 to 1,000,000 dalton (determined by gel permeation chromatography).

The polymers prepared by the novel process are distinguished in particular by high heat stability, high toughness and mechanical strength as well as by excellent electrical properties (low dielectric constant, low loss factor or tanδ-value) and are suitable for use in the vacuum casting technology, as casting resins, impregnating resins, impregnating resins and, preferably, as encapsulating material for electrical and electronic components.

This invention also relates to a process for the preparation of moulded articles, which comprises introducing a curable two-component system comprising the above-mentioned components (c) and (d) into a mould by the RIM process and curing it.

This invention also relates to the use of a curable two-component system comprising the above components (c) and (d) as encapsulating material for electrical or electronic components.

EXAMPLES

The dicyclopentadiene used in the following Examples is degassed for about 15 minutes at room temperature under vacuum (3 mbar) and is then stored under nitrogen. [(p-cymene)RuCl$_2${2,4,8,10-tetrakis(1,1-dimethylethyl)-6-methoxydibenzo[d,f][1,3,2]dioxaphosphepine}], [(p-cymene)RuCl$_2$(triphenylphosphite)] and [(p-cymene) RuCl$_2${tris(p-nonylphenyl)phosphite}] are prepared by adding one equivalent of the corresponding phosphite to a solution consisting of [(p-cymene)RuCl$_2$]$_2$ in methylene chloride. The pure products are isolated in virtually quantitative yield by removing the solvent by distillation and subsequent washing with hexane.

The following abbreviations are used:

DCPD: dicyclopentadiene (unless otherwise stated: 97%, of B. F. Goodrich)

DSC: differential scanning calorimetry

TGA thermogravimetrical analysis $T_g$: glass transition temperature (determined by DSC, heating rate: 10° C./min)

EXAMPLE 1

A solution consisting of 25 mg of [(p-cymene)RuCl$_2$]$_2$ and 13 µl of butyronitrile in 5 ml of DCPD is stirred for 30 min at 80° C. The [(p-cymene)RuCl$_2$(butyronitrile)$_2$] solution so obtained is charged with 2.9 ml of a solution consisting of tricyclohexylphosphine in DCPD (1% by weight) and is then cured (16 h/80° C. 2 h/120° C.), resulting in a yellow solid polymer ($T_g$=33° C.).

EXAMPLE 2

A solution consisting of 25 mg of [(p-cymene)RuCl$_2$]$_2$ and 20 µl of capronitrile in 5 ml DCPD is stirred for 30 min at 80° C. The [(p-cymene)RuCl$_2$(capronitrile)$_2$] solution so obtained is charged with 2.9 ml of a solution consisting of tricyclohexylphosphine in DCPD (1% by weight) and is then cured (16 h/80° C.; 2 h/120° C.), resulting in a yellow solid polymer ($T_g$=40° C.).

EXAMPLE 3 a solution consisting of 61 mg of [(p-cymene)RuCl$_2${2,4,8,10-tetrakis(1,1-dimethylethyl)-6methoxydibenzo[d,f][1,3,2]dioxaphosphepine}] in 5 ml DCPD is charged with 2.9 ml of a solution consisting of tricyclohexylphosphine in DCPD (1% by weight) and is then cured (16 h/80° C.: 3.5 h/120° C.), resulting in a greenish-brown solid polymer ($T_g$=31° C.).

EXAMPLE 4 a solution consisting of 31 mg of [(p-cymene)RuCl$_2$(triphenylphosphite)] in 5 ml of DCPD is charged with 14 mg of tricyclohexylphosphine and 7 µl of phenylacetylene and is then cured (55 h/80° C.; 2 h/120° C.), resulting in a brown solid polymer ($T_g$=103° C.).

EXAMPLE 5 a solution consisting of 31 mg of [(p-cymene)RuCl$_2$(triphenylphosphite)] in 5 ml of DCPD is charged with 14 mg of tricyclohexylphosphine and 5 µl of phenylacetylene and is then cured (55 h/80° C.; 2 h/120° C.), resulting in a brown solid polymer ($T_g$=103° C.).

EXAMPLE 6 a solution consisting of 31 mg of [(p-cymene)RuCl$_2$(triphenylphosphite)] in 5 ml of DCPD is charged with 14 mg of tricyclohexylphosphine and 5 µl of phenylacetylene and is then cured (1.5 h/100° C.; 2.5 h/120° C.; 15 h/150° C.), resulting in a hard yellow polymer ($T_g$=146° C.).

EXAMPLE 7 a solution consisting of 31 mg of [(p-cymene)RuCl$_2$(triphenylphosphite)] in 5 ml of DCPD is charged with 14 mg of tricyclohexylphosphine and 5 µl of phenylacetylene and is then cured (1.5 h/80° C.; 2.5 h/100° C.; 15 h/150° C.), resulting in a hard brown polymer ($T_g$=146° C.).

EXAMPLE 8

A solution consisting of 50 mg of [(p-cymene)RuCl$_2${(tris (p-nonylphenyl)phosphite}] in 5 ml of DCPD is charged with 14 mg of tricyclohexylphosphine and 5 µl of phenylacetylene and is then cured (2 h/80° C.; 2 h/120° C; 14 h/140° C.), resulting in a hard brown polymer ($T_g$=95° C.).

EXAMPLE 9 a solution consisting of 50 mg of [(p-cymene)RuCl$_2${tris (p-nonylphenyl)phosphite}] in 5 ml of DCPD (94%, shell) is charged with 14 mg of tricyclohexylphosphine and is then cured (2 h/80° C.; 2 h/120° C.; 10 h/140° C.), resulting in a hard polymer ($T_g$=128° C.).

EXAMPLE 10 a solution consisting of 150 mg of [(p-cymene)RuCl$_2${tris (p-nonylphenyl)phosphite}] in 10 ml of DCPD (94%, of Shell) is charged with a solution consisting of 40 mg of tricyclohexylphosphine in 5 ml of DCPD (94%, of Shell) and is then cured (2 h/80° C.; 2 h/120° C.; 10 h/140° C.), resulting in a hard polymer ($T_g$=132° C.).

EXAMPLE 11

A solution consisting of 150 mg of [(p-cymene)RuCl$_2${tris (p-nonylphenyl)phosphite}] in 10 ml of DCPD (94%, of Shell) is charged with a solution consisting of 35 mg of tris(isopropyl)phosphine in 5 ml of DCPD (94%, of shell) and is then cured (2 h/80 ° C.; 2° C.; 10 h/140° C.), resulting in a hard polymer ($T_g$=130° C.).

What is claimed is:

1. A catalyst system for the ring-opening metathesis polymerization, which consists of at least two components (a) and (b), wherein (a) is a ruthenium compound of formula I or II

wherein $L_1$, $L_2$, $L_3$ and $L_4$ are each independently of the other $C_1$–$C_{18}$alkylcyanide, $C_6$–$C_{25}$aralkylcyanide, tertiary amine, tertiary phosphine which does not contain any secondary alkyl or cycloalkyl radicals bound to the phosphorus atom, or phosphite, X is halogen, A is arene, m, n, o and p are integers from 0 to 4, where $2 \leq m+n+o+p \leq 4$, r and s are integers from 0 to 2, where $1 \leq r+s \leq 2$, and (b) is a tertiary phosphine containing at least one secondary alkyl radical or cycloalkyl radical bound to the phosphorus atom.

2. A catalyst system according to claim 1, wherein component (a) is a compound of formula I or II, wherein X is chloro.

3. A catalyst system according to claim 1, wherein component (a) is a compound of formula II, wherein A is benzene, toluene, o-xylene, p-xylene, mesitylene, ethylbenzene, cumene, 1,3,5-triisopropylbenzene, p-cymene, durene, hexamethylbenzene, naphthalene, biphenyl or diphenylmethane.

4. A catalyst system according to claim 1, wherein component (a) is a compound of formula I or II, wherein one or several ligands $L_1$ to $L_4$ are acetonitrile, propionitrile, n-butyronitrile, valeronitrile or capronitrile.

5. A catalyst system according to claim 1, wherein component (a) is a compound of formula I or II, wherein one or several ligands $L_1$ to $L_4$ are triphenylphosphine, methyldiphenylphosphine, dimethylphenylphosphine, tri(n-butyl)phosphine, tri(n-octyl)phosphine, trimethylphosphite, triisopropylphosphite, triphenylphosphite, tris(p-nonylphenyl)phosphite or a compound of formula III

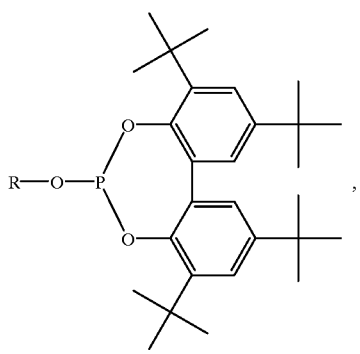

(III)

wherein R is $C_1$–$C_{18}$alkyl, $C_5$–$C_{14}$aryl or $C_6$–$C_{24}$aralkyl.

6. A catalyst system according to claim 1, wherein component (a) is a compound of formula II, wherein A is p-cymene, r is 2, and $L_1$ is butyronitrile or capronitrile.

7. A catalyst system according to claim 1, wherein component (a) is a compound of formula II, wherein A is p-cymene, r is 1, s is 0, and $L_1$ is triphenylphosphite, tris(p-nonylphenyl)-phosphite or 2,4,8,10-tetrakis(1,1-dimethylethyl)-6-methoxydibenzo[d,f][1,3,2]dioxaphosphepine.

8. A catalyst system according to claim 1, wherein component (b) is triisopropylphosphine or tricyclohexylphosphine.

\* \* \* \* \*

UNITED STATES PATENT AND TRADEMARK OFFICE
CERTIFICATE OF CORRECTION

PATENT NO. : 5,998,326
DATED : DECEMBER 7, 1999
INVENTOR(S) : ANDREAS HAFNER ET AL.

It is certified that error appears in the above-identified patent and that said Letters Patent is hereby corrected as shown below:

On the title page, Section [30] should read:

-- [30]  Foreign Application Priority Data

May 23, 1997    Switzerland    1204/97 --.

Signed and Sealed this

First Day of August, 2000

*Attest:*

Q. TODD DICKINSON

*Attesting Officer*  *Director of Patents and Trademarks*